United States Patent [19]

Suzuki et al.

[11] Patent Number: 4,951,401
[45] Date of Patent: Aug. 28, 1990

[54] SOLDER REFLOW APPARATUS

[75] Inventors: Ryoichi Suzuki; Hidetoshi Nakamura, both of Tokyo, Japan

[73] Assignee: Senju Metal Industry Co., Ltd., Tokyo, Japan

[21] Appl. No.: 303,201

[22] Filed: Jan. 30, 1989

[30] Foreign Application Priority Data

Sep. 16, 1988 [JP] Japan .............................. 63-120425[U]

[51] Int. Cl.⁵ .............................................. F26B 21/06
[52] U.S. Cl. ............................................ 34/77; 34/79
[58] Field of Search ..................... 34/68, 72, 73, 76, 77, 34/78, 79, 82; 432/197; 228/180.1

[56] References Cited

U.S. PATENT DOCUMENTS 4,238,122 12/1980 Snyder et al. ............................ 34/78
4,321,031 3/1982 Woodgate ................................ 34/219
4,771,929 9/1988 Bahr et al. .

FOREIGN PATENT DOCUMENTS 59-61567 4/1984 Japan .
59-220282 12/1984 Japan .
61-141199 6/1986 Japan .
63-215371 9/1988 Japan .

Primary Examiner—Henry A. Bennet
Attorney, Agent, or Firm—Sughrue, Mion, Zinn, Macpeak & Seas

[57] ABSTRACT

A reflow apparatus for soldering has a tunnel and a pipe which form an endless passageway for hot gas. Infrared panel heaters are disposed inside the tunnel for heating printed circuit boards which travel through the tunnel on a conveyor. Hot gas is made to circulate through the passageway by a flow-producing device. A filter is disposed in the passageway for removing particles from fumes which are formed during soldering.

17 Claims, 5 Drawing Sheets

SOLDER REFLOW APPARATUS

BACKGROUND OF THE INVENTION

This invention relates to a solder reflow apparatus which is used for soldering of printed circuit boards using solder cream.

In general, solder reflow apparatuses can be classified as radiation types and hot gas types. A radiation-type reflow apparatus is one in which a large number of panel heaters are disposed in the upper and lower portions of a tunnel, and printed circuit boards are heated by the heat radiated from the panel heaters. The inside of the apparatus can be heated to a suitable temperature for soldering by controlling the current to be supplied to the panel heaters. Recently, panel heaters which emit far infrared radiation have come to be used in reflow apparatuss. Far infrared radiation heaters are efficient at heating objects and are said to be suitable for the soldering of printed circuit boards in solder reflow apparatuses. However, far infrared radiation has the drawback that as printed circuit boards and electronic components become ever thinner and more sensitive to heat, it becomes easier for even slight overheating by the radiation to produce thermal damage. Another problem with radiation-type reflow apparatuses relates to the fact that panel heaters which emit far infrared radiation are made of electrically resistive materials and are heated up by the application of electric current. The temperature of the material which surrounds the heater does not immediately change in response to changes in the heater current. Namely, even if the current to a panel heater is cut off when the heated portion reaches a prescribed temperature, the temperature of the material surrounding the heater may continue to rise for a short while. On the other hand, if the temperature of the heated portion is below a prescribed temperature and current is passed through the heater, the temperature of the material surrounding the heater may be falling and will not immediately start to rise.

A solder reflow apparatus of the hot gas type is one in which hot gas is always circulating past a heater, so there is the advantage that the heating temperature can always be maintained constant. For this reason, in recent years, hot gas reflow furnaces of the tunnel type have come to be much used.

Due to recent advances in the technology of mounting components on printed circuit boards, devices which formerly had to be mounted on separate printed circuit boards can now be mounted on a single printed circuit board. It has also become possible to mount electronic parts such as power transistors on printed circuit boards. However, the packaging density of such printed circuit boards tends to be nonuniform over the area thereof, and this fact along with the presence of large components results in the heat capacity locally varying over the printed circuit board. If such printed circuit boards are soldered using far infrared radiation, the temperature of portions having a high heat capacity will not rise as much as other portions, causing incomplete melting of the solder and poor electrical connections. On the other hand, in those portions of the printed circuit board having a low heat capacity, the temperature will rise too high, causing scorching of the printed circuit board and heat damage to electronic parts.

It has been found that uneven heating of a printed circuit board can be prevented by passing hot gas through a tunnel so as to achieve a uniform temperature within the tunnel. Various devices have been proposed for passing a hot gas through tunnels for this purpose. See, for example, Japanese Laid-Open Utility Model Application No. 59-61567, Japanese Laid-Open Patent Application No. 59-220282, and Japanese Laid-Open Patent Application No. 61-141199. However, each of these devices has various problems.

The solder reflow apparatus disclosed in Japanese Laid-Open Utility Model Application No. 59-61567 has a fan mounted on the upper portion of a tunnel, so hot gas is blown only downwards, and there is no effect from the hot gas except in the region immediately below the fan. Furthermore, as the hot gas circulates only in the vertical direction of the tunnel, it is difficult to adjust the temperature merely by adjusting the rotational speed of the fan.

Japanese Laid-Open Patent Application No. 59-220282 discloses a solder reflow apparatus in which a gaseous heating medium is introduced from the outside of the furnace and is preheated by an auxiliary heater or the like. In that device, it is possible to control the temperature of the hot gaseous medium which flows through the tunnel. However, after passing through the tunnel, the gaseous heating medium is discharged to the outside of the tunnel through a discharge port. Accordingly, this solder reflow apparatus is expensive to manufacture, and it is uneconomical to operate because electricity is used to heat the gaseous heating medium and because the gaseous heating medium is discarded. Furthermore, if the gaseous heating medium is discharged into a room, the room becomes filled with fumes which smell of flux and pose an air pollution problem.

Japanese Laid-Open Patent Application No. 61-141199 discloses a solder reflow apparatus in which air enters through a lower air intake port and is heated by a heater. The hot air is discharged after it has been used for heating, so that invention suffers from the same problems of poor economy and of causing air pollution as does Japanese Laid-Open Patent Application No. 50-220282.

Japanese Laid-Open Patent Application No. 63-215371 corresponding to U.S. Pat. No. 4,771,929 discloses circulation of part of the hot gas withdrawn from the furnace.

SUMMARY OF THE INVENTION

Accordingly, it is an object of the present invention to provide a novel solder reflow apparatus which can solve the above-described drawbacks of conventional hot gas reflow apparatuses.

It is another object of the present invention to provide a solder reflow apparatus which allows the easy adjustment of the temperature of gases within the furnace.

It is yet another object of the present invention to provide a solder reflow apparatus which does not discharge gases or unpleasant odors to the outside thereof.

It is still another object of the present invention to provide a solder reflow apparatus which consumes little energy.

These objectives could conceivably be met by a solder reflow apparatus which employs a circulating heated gas. However, such solder reflow apparatuses of the gas-circulating type suffer from problems related to the nature of solder cream which is used to solder printed circuit boards in reflow apparatuses.

Solder cream is a viscous cream which is formed by mixing a flux and solder powder. The flux is made by liquefying a solid component such as pine resin, a thixotropic agent, or an activator using a solvent. When cream solder is heated, fumes are formed which contain not only the solvent but also the solid component of the flux, and the inside of the solder reflow furnace becomes filled with the fumes. In a solder reflow apparatus of the gas-circulating type, the fumes are circulated together with the hot gas. As the concentration of the fumes inside the furnace increases, the thick fumes contact the walls of the oven and the blower. The contact with these parts cools the fumes and causes the solid components to resolidify and adhere to the surface which they contact. Over a long period of time, the adhered solids accumulate to a considerable thickness, and at times, they peel and fall off. If the falling solids fall onto a printed circuit board which is passing through the reflow furnace, not only will the printed circuit board become dirty, but the falling solids can cause a decrease in electrical resistance, corrosion, and other problems which can adversely affect the electrical components on the printed circuit board. In addition, if solids originating from flux fumes adhere to the blower which circulates hot gas through the furnace, the operation of the blower can be impaired, and solids which have built up on the blower can be thrown by the blower with great force at printed circuit boards passing through the oven, resulting in damage to the printed circuit boards.

In the present invention, in order to solve this problem, a filter is disposed in an endless passageway for circulating hot gas along which an object to be soldered is passed. Solid particles in fumes which are generated during soldering can be removed from the circulating hot gas by the filter and prevented from adhering to the inside of the furnace. Therefore, the hot gas which circulates through the furnace is always kept clean, and damage to objects being soldered by falling solids or damage to blowers and other parts due to solids adhering thereto can be prevented.

In addition, the hot gas always remains inside the solder reflow apparatus and is repeatedly reused, so the amount of heat required to heat the gas is reduced.

Furthermore, because the hot gas remains in the solder reflow apparatus, no noxious fumes are discharged to the outside of the solder reflow apparatus.

A solder reflow apparatus of the tunnel type in accordance with the present invention comprises a tunnel provided with a preheating zone and a main heating zone, an endless passageway for circulating a hot gas through at least a portion of the tunnel, flow-producing means for causing a gas to circulate along the passageway, a conveyor for transporting an object to be soldered along a portion of the passageway, and a filter which is disposed along the passageway for filtering the gas as it circulates through the passageway.

In one aspect of the invention, the tunnel has a gas supply port and a gas recovery port, and the passageway comprises a pipe which is connected between the gas supply port and the gas recovery port on the outside of the tunnel. The gas supply port and the gas recovery port are disposed at different points along the length of the tunnel so that the hot gas will flow through the tunnel in the axial direction thereof and parallel to the direction of movement of the conveyor.

In another aspect of the present invention, the passageway is provided within a tunnel through which the conveyor passes and a hood which is disposed inside the tunnel above the conveyor and which has an inlet in the upper portion thereof and an outlet which confronts the conveyor. The filter is mounted in the hood, and the flow-producing means is a blower which is disposed inside the hood. Instead of circulating in the axial direction of the tunnel, the hot gas circulates in the vertical direction while it passes through the hood and the filter.

A heater is provided within a tunnel for heating an object as it is transported by the conveyor. The heater is not restricted to any certain type, but infrared and far infrared heaters are particularly suitable because of their heating efficiency.

BRIEF DESCRIPTION OF THE DRAWINGS

In the drawings, the same reference numerals indicate the same or corresponding parts.

DESCRIPTION OF THE PREFERRED EMBODIMENTS

Figure 1:
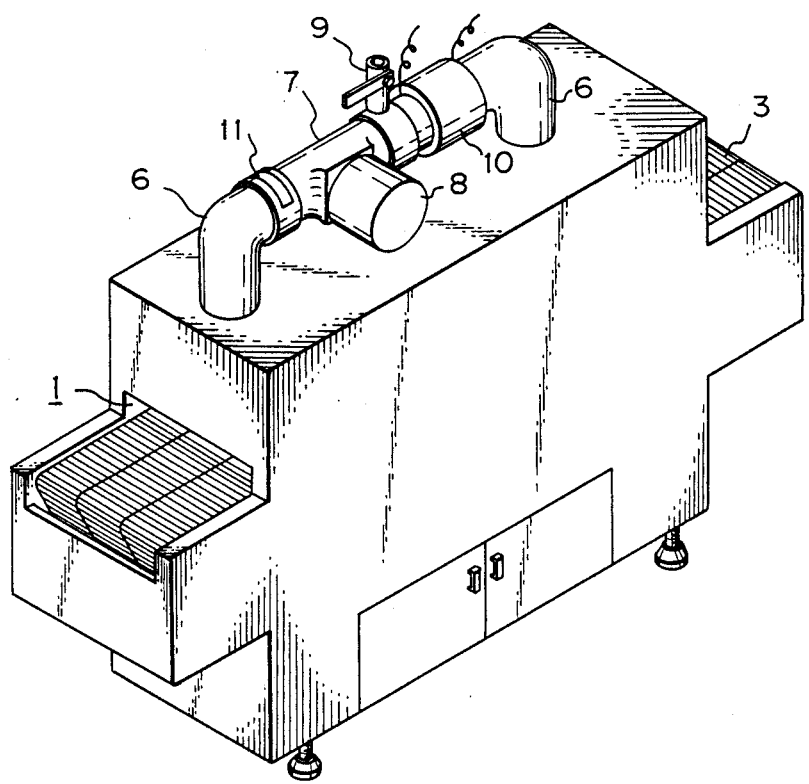
FIG. 1 is a perspective view of a first embodiment of a solder reflow apparatus in accordance with the present invention.
Figure 2:
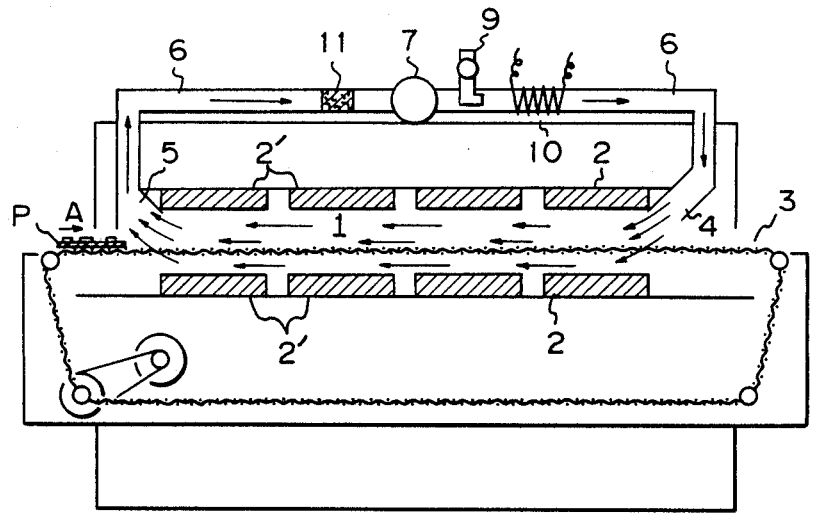
FIG. 2 is a schematic longitudinal cross-sectional view of the embodiment of FIG. 1.

Hereinbelow, a number of preferred embodiments of a solder reflow apparatus in accordance with the present invention will be described while referring to the accompanying drawings, of which FIGS. 1 and 2 illustrate a first embodiment. As shown in these figures, the solder reflow apparatus is of the tunnel-type comprising a tunnel 1 which is furnished with a plurality of infrared heaters 2 and 2' in the upper and lower portions thereof. The heaters 2' on the left side of the tunnel 1 are preheaters, while the heaters 2 on the right side of the tunnel 1 are main heaters. Thus, the solder reflow apparatus comprises a preheating zone provided with the heaters 2' and a solder reflow zone, i.e., main heating zone provided with the heaters 2. A cooling zone may also be provided. A conventional conveyor 3 transports printed circuit boards P between the upper and lower heaters 2 and 2' in the direction shown by arrow A. A gas supply port 4 and a gas recovery port 5 are formed at opposite axial ends of the tunnel 1. In this embodiment, the gas supply port 4 is near the exit of the tunnel 1 while the gas recovery port 5 is disposed near the entrance. The gas supply port 4 and the gas recovery port 5 are disposed at opposite ends of the tunnel 1 so that hot gas will circulate in a direction parallel and opposite to the direction of movement of the printed circuit boards P, whereby a uniform temperature distribution of the printed circuit boards P can be attained.

The gas supply port 4 and the gas recovery port 5 are connected with one another by a gas-circulating conduit, e.g. pipe 6 which extends around the outside of the tunnel 1. A flow-producing device 7 such as a pump or a blower is installed in the pipe 6. The flow-producing device 7 is a device which makes a gas flow in one direction through the pipe 6 from the gas recovery port 5 to the gas supply port 4. The flow speed of the gas can be adjusted by controlling a drive motor 8 which powers the flow-producing device 7. When the temperature of the hot gas within the pipe 6 exceeds a prescribed temperature, cool air from the outside can be introduced into the pipe 6 through an air inlet 9. It is also possible to introduce an inert gas into the tunnel 1 through the air inlet 9 and create an atmosphere of inert hot gas within the tunnel 1. When the temperature of the hot gas within the pipe 6 becomes too low, the hot gas can be heated by a heater 10.

When the cream solder on the printed circuit boards P melts, volatile components of the flux of the cream solder vaporize, and these components along with solid particles form fumes. These fumes are entrained in the circulating gas flowing through the tunnel 1. To prevent these fumes from adhering to inside of the tunnel 1 and the pipe 6, the filter 11 is disposed in the pipe 6. A filter 11 can also be disposed in the gas suction port 5.

Next, the properties of a solder reflow apparatus according to the present invention will be described.

Figure 3:
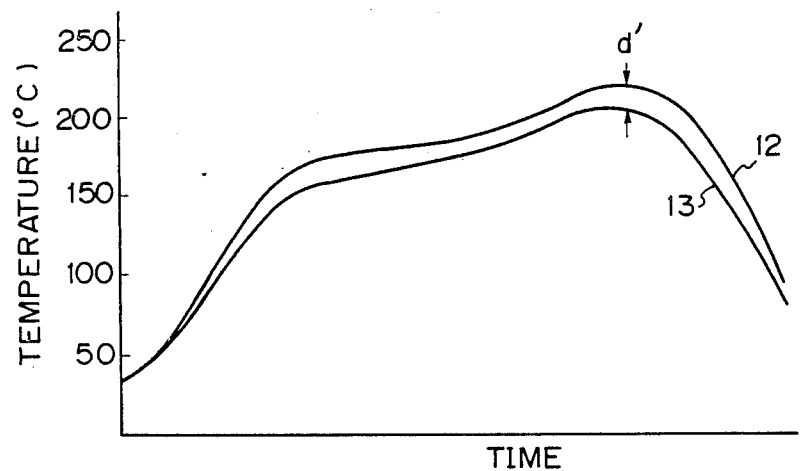
FIGS. 3 and 4 are temperature profiles of printed circuit boards which were processed using the solder reflow apparatus of the present invention and a conventional solder reflow apparatus, respectively.
Figure 4:
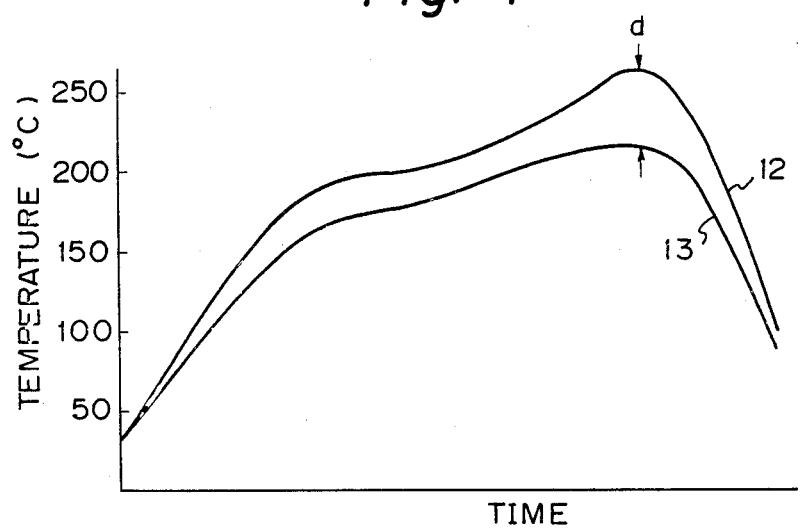

FIG. 3 shows the temperature profile of printed circuit boards which were soldered using the embodiment of FIG. 2, while FIG. 4 shows the temperature profile for the same solder reflow apparatus when only infrared heaters were used without a circulating hot gas.

As is clear from FIG. 4, when heating is performed using only infrared heaters, during the main stage of heating in which the cream solder is melted, there is a difference "d" of up to 50° C. between the minimum temperature 12 and the maximum temperature 13 of the printed circuit boards P. However, using the solder reflow apparatus of the present invention in which hot gas is circulated through the tunnel 1, the difference "d'" between the minimum and maximum temperatures is at most 20° C.

In this embodiment, hot gas is brought to the outside of the tunnel 1 through a pipe 6 of which part of the passageway for hot gas is composed. When the temperature of the hot gas becomes too high, outside air can be introduced into the pipe 6, and if the temperature of the hot gas is too low, the hot gas can be heated by the heater 10, which can be disposed either on the inside or the outside of the pipe 6. Thus, the temperature of the hot gas can be easily controlled.

The provision of the filter 11 makes it possible to constantly remove fumes which are contained in the circulating hot gas. Therefore, the heated gas which is blown at the printed circuit boards P is always clean. Furthermore, fumes can be prevented from adhering to the printed circuit board P or to the inside of the tunnel 1 or the pipe 6.

Figure 5:
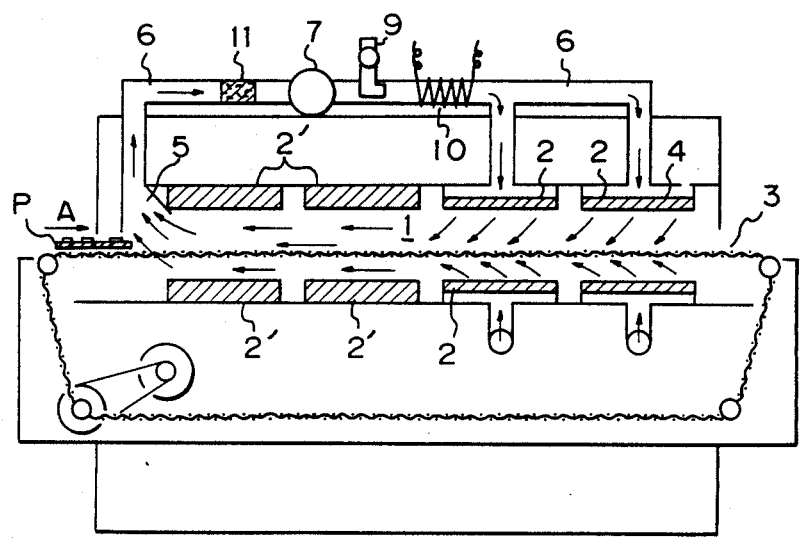
FIG. 5 is a schematic longitudinal cross-sectional view of a second embodiment of the present invention.

FIG. 5 is a longitudinal cross-sectional view of a second embodiment of the present invention. In this embodiment, far infrared heaters 2 and 2' such as those disclosed in U.S. patent application Ser. No. 156,632 are mounted inside a tunnel 1 above and below a conveyor 3. The main heaters 2, which have a porous surface, are each disposed over a gas supply port 4. The porous surface of the main heaters 2 may be made of a ceramic, so they generate far infrared rays which can heat the boards P efficiently. A gentle flow of hot gas is discharged into the tunnel 1 from the porous surface of the main heaters 2, so there is no danger of electronic components being blow off a printed circuit board by a blast of hot gas. This embodiment is otherwise the same as the embodiment of FIG. 2.

Figure 6:
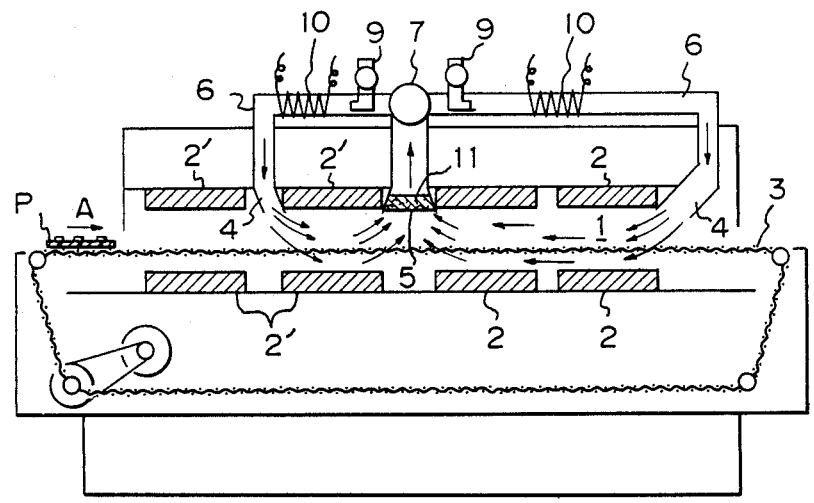
FIG. 6 is a schematic longitudinal cross-sectional view of a third embodiment of the present invention.

FIG. 6 is a longitudinal cross-sectional view of a third embodiment of the present invention. In this embodiment, a gas recovery port 5 is formed near the lengthwise center of a tunnel 1. A gas supply port 4 is formed in the upper portion of the tunnel 1 between two preheaters 2', and another gas supply port 4 is formed near the exit of the tunnel 1. A filter 11 is installed in the gas recovery port 5. The gas recovery port 5 is connected to both gas supply ports 4 by two pipes 6 which extend to the outside of the tunnel 1 and branch from a flow-producing device 7. Each pipe 6 is equipped with its own outside air inlet 9 and heater 10 so that the temperature of the gas flowing through each pipe 6 can be controlled independently of the temperature in the other pipe 6. Hot gas at a first temperature, such as 150° C., is blown from the gas supply port 4 near the exit, and hot gas at a second temperature, such as 220° C., is blown from the other gas supply port 4 between the two preheaters 2'. Both streams of hot gas flow towards the center of the tunnel 1 and into the gas recovery port 5. The use of two streams of hot gas of different temperatures reduces the difference between the maximum and minimum temperatures of the printed circuit boards P within the tunnel 1 to at most 10° C. The hot gas at 220° C. increases the temperature of the printed circuit boards P in the preheating zone provided with the preheaters 2' when they are passing therebetween, and the hot gas at 150° C. which blows over the printed circuit boards P in the main heating zone provided with the main heaters 2 transfers heat from the high temperature portion of the printed circuit board P to the low temperature portion thereof, thereby decreasing the temperature difference between the two portions.

Figure 7:
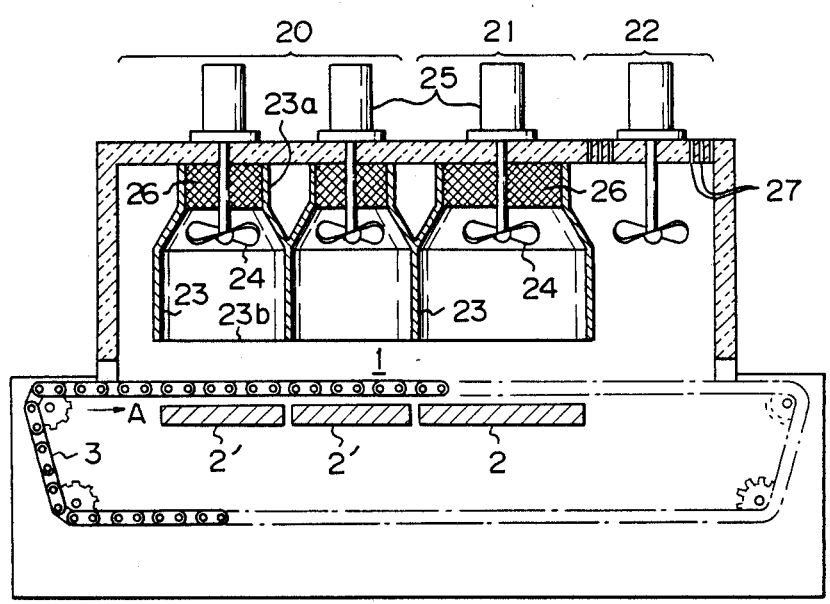
FIG. 7 is a schematic longitudinal cross-sectional view of a fourth embodiment of the present invention.
Figure 8:
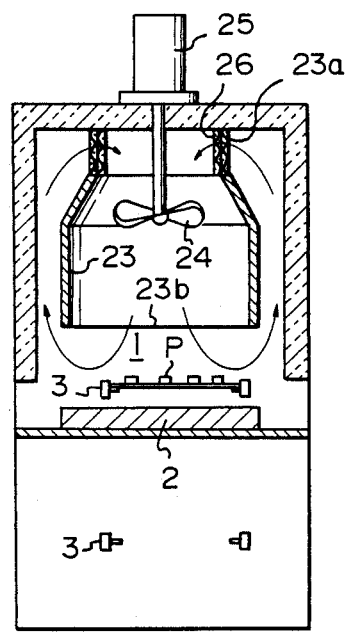
FIG. 8 is a schematic transverse cross-sectional view of the embodiment of FIG. 7.

In each of the preceding embodiments, hot gas is made to circulate through a tunnel 1 in the axial direction thereof FIGS. 7 and 8 illustrate a fourth embodiment of the present invention in which hot gas circulates vertically within the tunnel furnace. As shown in FIG. 7, which is a longitudinal cross-sectional view of this embodiment, a tunnel 1 is divided into a preheating zone 20, a main heating zone 21, and a cooling zone 22. A conventional conveyor 3 which is powered by an unillustrated drive mechanism passes through the tunnel 1 and transports printed circuit boards P in the direction of arrow A. A plurality of preliminary heaters 2' and main heaters 2 are disposed in the bottom portion of the tunnel 1 so as to heat the printed circuit boards P from below. A plurality of hoods 23 are mounted in the upper portion of the tunnel 1 above the conveyor 3 in the preliminary heating zone 20 and the main heating zone 21. Each hood 23 extends downwards from the top of the tunnel 1 towards the conveyor 3 and has an inlet 23a in the upper portion thereof and an outlet 23b in the bottom portion thereof which confronts the conveyor 3. A removable filter 26 for filtering hot gas is mounted in the inlet 23a. The filter 26 can be cleaned by washing when it becomes clogged. A blower 24 for circulating hot gas extends into each hood 23 from above. The blowers 24 are driven by corresponding electric motors 25 which are mounted atop the tunnel 1. The cooling zone 22 is not equipped with a hood 23 but has another blower for blowing cooling air onto the printed circuit board on the conveyor 3. Cool air from the outside of the tunnel 1 is drawn into the tunnel 1 through a plurality of holes 27 for cooling air which are formed in the top surface of the tunnel 1 in the cooling zone 22. This cool air is blown at the printed circuit boards P in the cooling zone 22 in order to cool them.

In this embodiment, as shown in FIG. 8, which is a transverse cross-sectional view thereof, a passageway for the circulation of hot gas is formed by the inside of the hood 23 and the space between the outside of the hood 23 and the inside of the tunnel 1. Gas inside the tunnel 1 is heated by the heaters 2 and 2'. The blower 24 blows hot gas downwards, as shown by the arrows, through the outlet 23b of the hood 23 towards the conveyor 3. After leaving the hood 23, the hot gas flows upwards between the outside of the hood 23 and the side walls of the tunnel 1 and rises to the top of the tunnel 1, where it reenters the hood 23 through the inlet 23a. The hot gas flowing over the printed circuit boards P melts the solder cream which is coated on the boards P, and the melted flux in the solder generates fumes which are entrained in the hot gas. As the hot gas passes through the inlet 23a of the hood 23, it is cleaned by the filter 26, and any large fume particles which are entrained in the hot gas are collected by the filter 26. Therefore, the hot gas which is discharged from the outlet 23b is kept clean.

Figure 9:
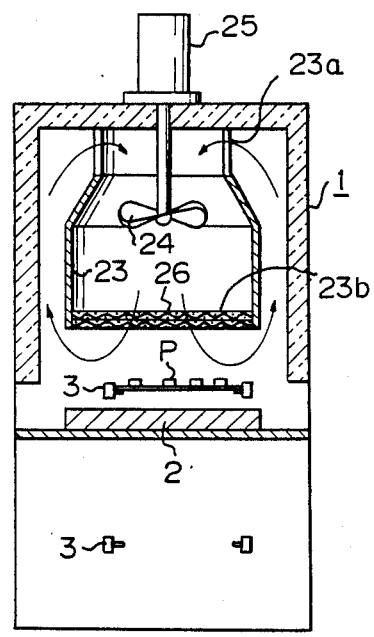
FIG. 9 is a schematic transverse cross-sectional view of a fifth embodiment of the present invention.

There is no restriction on the location of the filter 26, and FIG. 9 illustrates a fifth embodiment in a cross-sectional view similar to FIG. 8, in which a filter 26 is installed in the outlet 23b of a hood 23. The structure of this embodiment is otherwise identical to that of the previous embodiment. Installing the filter 26 at the lower end of the hood 23 reduces the strength of the stream of hot gas which is blown at the printed circuit boards P and prevents the printed circuit boards P from being damaged by a blast of hot gas.

In the embodiments of FIGS. 7-9, the circulating hot gas always remains inside the tunnel 1. However, it is also possible to circulate the hot gas from the lower end to the upper end of the hood 23 by a pipe which extends to the outside of the tunnel 1 in a manner similar to the previous embodiments.

The structure of a filter employed in the present invention is not restricted to a specific one so far as it can efficiently remove solid particles from the circulating hot gas or it can remove fumes from the hot gas when they solidify on the surface thereof. An example of the filter is a net of stainless steel mesh. Preferably, two or three nets of stainless steel mesh are placed on one another to form a panel filter.

Although the present invention has been described with preferred embodiments it is to be understood that variations and modifications may be employed without departing from the concept of the invention as defined in the following claims.

We claim:

1. A solder reflow apparatus of the tunnel type comprising:
   a tunnel provided with a preheating zone and a main heating zone;
   a passageway for circulating a hot gas through at least a portion of the tunnel;
   flow-producing means for causing the gas to circulate through said passageway;
   a conveyor for transporting an object to be soldered along a portion of said passageway; and
   a filter which is disposed in said passageway for cleaning the gas as it circulates through said passageway.

2. A solder reflow apparatus as claimed in claim 1, wherein:
   said tunnel has a gas supply port and a gas recovery port; and
   said passageway comprises a pipe which connects said gas supply port to said gas recovery port on the outside of said tunnel.

3. A solder reflow apparatus as claimed in claim 2, wherein:
   said tunnel has an entrance through which said conveyor enters said tunnel and an exit through which said conveyor leaves said tunnel;
   said gas supply port is disposed near said exit;
   said gas recovery port is disposed near said entrance; and
   said flow-producing means comprises means for making the gas flow through said pipe from said gas recovery port to said gas supply port.

4. A solder reflow apparatus as claimed in claim 2, further comprising a pipe heater which is installed on said pipe for heating the gas as it passes through said pipe.

5. A solder reflow apparatus as claimed in claim 1, further comprising a soldering heater for heating an object to be soldered as it is transported by said conveyor in said tunnel.

6. A solder reflow apparatus as claimed in claim 5, wherein said soldering heater has a porous surface and is disposed over said gas supply port so that the gas must pass through the porous surface of said heater to heat the object.

7. A solder reflow apparatus as claimed in claim 6, wherein said porous surface is made of a ceramic.

8. A solder reflow apparatus as claimed in claim 2, wherein said filter is disposed in said pipe.

9. A solder reflow apparatus as claimed in claim 2, wherein said filter is disposed in said gas recovery port.

10. A solder reflow apparatus as claimed in claim 5, wherein said soldering heater is an infrared heater.

11. A solder reflow apparatus as claimed in claim 5, wherein said soldering heater is a far infrared heater.

12. A solder reflow apparatus as claimed in claim 1, wherein:
    said tunnel has a gas recovery port and a plurality of gas supply ports.

13. A solder reflow apparatus of the tunnel type comprising:
    a tunnel provided with a preheating zone and a main heating zone;
    a passageway for circulating a hot gas through at least a portion of the tunnel;
    flow-producing means for causing the gas to circulate through said passageway;
    a conveyor for transporting an object to be soldered along a portion of said passageway; and
    a filter which is disposed in said passageway for cleaning the gas as it circulates through said passageway; and said tunnel having first and second gas supply ports disposed on either side of said gas recovery port in the lengthwise direction of said conveyor;
    said passageway comprising pipe means which connects said gas recovery port to each of the first and second gas supply ports;
    said pipe means comprising a first pipe which communicates between said gas recovery port and said first gas supply port near the entrance of the tunnel and a second pipe which communicates between said gas recovery port and said second gas supply port near the exit of the tunnel; and said flow-producing means comprising means for drawing said gas from said tunnel through said gas recovery port, passing the gas through said first and second pipes, and discharging it into said tunnel through both of said gas supply ports.

14. A solder reflow apparatus as claimed in claim 13, further comprising a first pipe heater which is installed on said first pipe and a second pipe heater which is installed on said second pipe and which can be controlled independently of said first pipe heater.

15. A solder reflow apparatus as claimed in claim 14, wherein said first gas supply port opens onto a portion of said tunnel which is at a higher temperature than the portion of said tunnel onto which said second gas supply port opens, and the gas in the first pipe is heated by said first pipe heater to a higher temperature than the gas in said second pipe is heated by said second pipe heater.

16. A solder reflow apparatus of the tunnel type comprising:
- a tunnel provided with a preheating zone and a main heating zone;
- a passageway for circulating a hot gas through at least a portion of the tunnel;
- flow-producing means for causing the gas to circulate through said passageway;
- a conveyor for transporting an object to be soldered along a portion of said passageway; and
- a filter which is disposed in said passageway for cleaning the gas as it circulates through said passageway; and said passageway comprising a hood which is disposed inside said tunnel above said conveyor and which has an inlet in the upper portion thereof and an outlet which confronts said conveyor, said filter being mounted in said hood.

17. A solder reflow apparatus as claimed in claim 16, wherein said flow-producing means is a blower which is disposed inside said hood so as to blow gas downwards towards said conveyor.

* * * * *